(12) United States Patent
Tsuchiya et al.

(10) Patent No.: US 7,101,145 B2
(45) Date of Patent: Sep. 5, 2006

(54) REDUCED NOISE AIRCRAFT STATOR VANE

(75) Inventors: Naoki Tsuchiya, Hamura (JP); Dai Kato, Ome (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 95 days.

(21) Appl. No.: 10/796,065

(22) Filed: Mar. 10, 2004

(65) Prior Publication Data

US 2005/0008494 A1 Jan. 13, 2005

(30) Foreign Application Priority Data

Mar. 28, 2003 (JP) .............................. 2003-091501

(51) Int. Cl.
*F01D 5/12* (2006.01)
(52) U.S. Cl. .................. 415/119; 415/208.2; 415/211.2
(58) Field of Classification Search ................ 415/119, 415/191, 192, 208.1, 208.2, 211.2
See application file for complete search history.

(56) References Cited

U.S. PATENT DOCUMENTS

| 4,470,755 A | * | 9/1984 | Bessay | ........................ 415/191 |
| 6,045,327 A | * | 4/2000 | Amr | ........................ 415/211.2 |
| 6,554,564 B1 | * | 4/2003 | Lord | ........................... 415/119 |

FOREIGN PATENT DOCUMENTS

JP          2002-349498          12/2002

* cited by examiner

*Primary Examiner*—Edward K. Look
*Assistant Examiner*—Nathan Wiehe
(74) *Attorney, Agent, or Firm*—Oblon, Spivak, McClelland, Maier & Neustadt, P.C.

(57) ABSTRACT

A fan of an aircraft engine is provided with a rotating fan rotor for feeding air aftward as a spiral flow and a stator vane for rectifying the spiral flow to be an axial flow. The fan stator vane is provided with a hub end portion extending radially relative to a rotating axis of the fan rotor and a tip end portion leaning toward a suction side. Leading edges of the hub end portion and the tip end portion have sweepback angles of from 27 degrees to 33 degrees relative to a radial direction defined by the rotating axis.

5 Claims, 8 Drawing Sheets

REDUCED NOISE AIRCRAFT STATOR VANE

BACKGROUND OF THE INVENTION

1. Field of the Invention

The present invention relates to a gas turbine engine for an aircraft, a fan thereof and a fan stator thereof.

2. Description of the Related Art

An aircraft engine is generally provided with a fan for feeding air to circular main and bypass flow paths formed coaxially in a main body thereof.

The fan is provided with a fan rotor rotatably disposed in the aircraft engine. The fan rotor is provided with plural rotor blades circumferentially arrayed. A fan stator is disposed adjacent to and aft of the fan rotor. The fan stator is provided with plural stator vanes circumferentially arrayed.

When driving the fan rotor so as to rotate, the rotor blades feed air to the fan stator. Though the fed air flows into the fan stator as a spiral flow, the stator vanes is configured so as to rectify the air to be an axial flow fed into the bypass flow path.

The air fed into the main flow path is utilized for combustion so as to generate exhaust flow emitted aft of the aircraft engine. The air fed into the bypass flow path is conducted so as to surround the exhaust flow.

Meanwhile, accompanying with the rotation of the fan rotor, trailing edges of the rotor blades generate and trail wake flows. The wake flows and the stator vane surfaces interfere with each other so as to generate pressure fluctuation on the stator vane surfaces, which is a main source of a fan noise. Therefore, to minimize the fan noise, several arts concerning with a stator vane structure had been proposed. The present inventors disclosed a related art in Japanese Patent Application Laid-open No. 2002-349498.

SUMMARY OF THE INVENTION

According to the related art, a fan noise can be effectively reduced. However, further reduction of the fan noise is now intensively desired.

The present invention is achieved from the aforementioned view and an object thereof is provision of an aircraft engine, a fan thereof and a stator vane thereof having reduced noise generation.

According to a first aspect of the present invention, A fan stator vane for a fan of an aircraft engine, the fan having an axis and the fan stator vane having a suction side and a pressure side, the fan stator vane is provided with a hub end portion extending radially relative to the axis and a tip end portion leaning toward the suction side, wherein leading edges of the hub end portion and the tip end portion have sweepback angles of from 27 degrees to 33 degrees relative to a radial direction defined by the axis. Preferably, the tip end portion has a lean angle of from 27 degrees to 33 degrees relative to the radial direction toward the suction side.

According to a second aspect of the present invention, a fan of an aircraft engine, the fan feeding air to circular main and bypass flow paths formed coaxially in the aircraft engine, the fan having an axis and the fan stator vane having a suction side and a pressure side, the fan is provided with a fan rotor rotating around the axis and comprising plural rotor blades circumferentially arrayed and configured so as to feed air and a fan stator disposed adjacent to and aft of the fan rotor, the fan stator comprising plural stator vanes circumferentially arrayed and configured so as to rectify the air fed from the fan rotor to be an axial flow, each of the stator vanes comprising a hub end portion extending radially relative to the axis and a tip end portion leaning toward the suction side, wherein leading edges of the hub end portion and the tip end portion have sweepback angles of from 27 degrees to 33 degrees relative to a radial direction defined by the axis. Preferably, the tip end portion has a lean angle of from 27 degrees to 33 degrees relative to the radial direction toward the suction side.

According to a third aspect of the present invention, an aircraft engine is provided with the fan described in the above second aspect.

DETAILED DESCRIPTION OF THE PREFERRED EMBODIMENT

An embodiment of the present invention will be described hereinafter with reference to FIGS. 1 through 3B. Throughout the specification, definitions of directions such as fore and aft are consistent with directions of elements in practical use. For example, a fore end is illustrated on the left in FIGS. 1, 2B and 3A. In and out are defined by near and far from an axis of the engine. Further, some definitions such as leading, trailing, a pressure side and a suction side are defined by gas flow directions in its steady operation state and therefore some of them are dependent on rotation directions of elements disposed upstream. For ease of explanation, a fan rotor 15 is supposed to rotate in an anticlockwise direction from an anterior view. In this supposition, a spiral flow fed by the fan rotor 15 goes from the right to the left in FIG. 2A, therefore the suction side is illustrated on the left in FIG. 2A.

Figure 1:
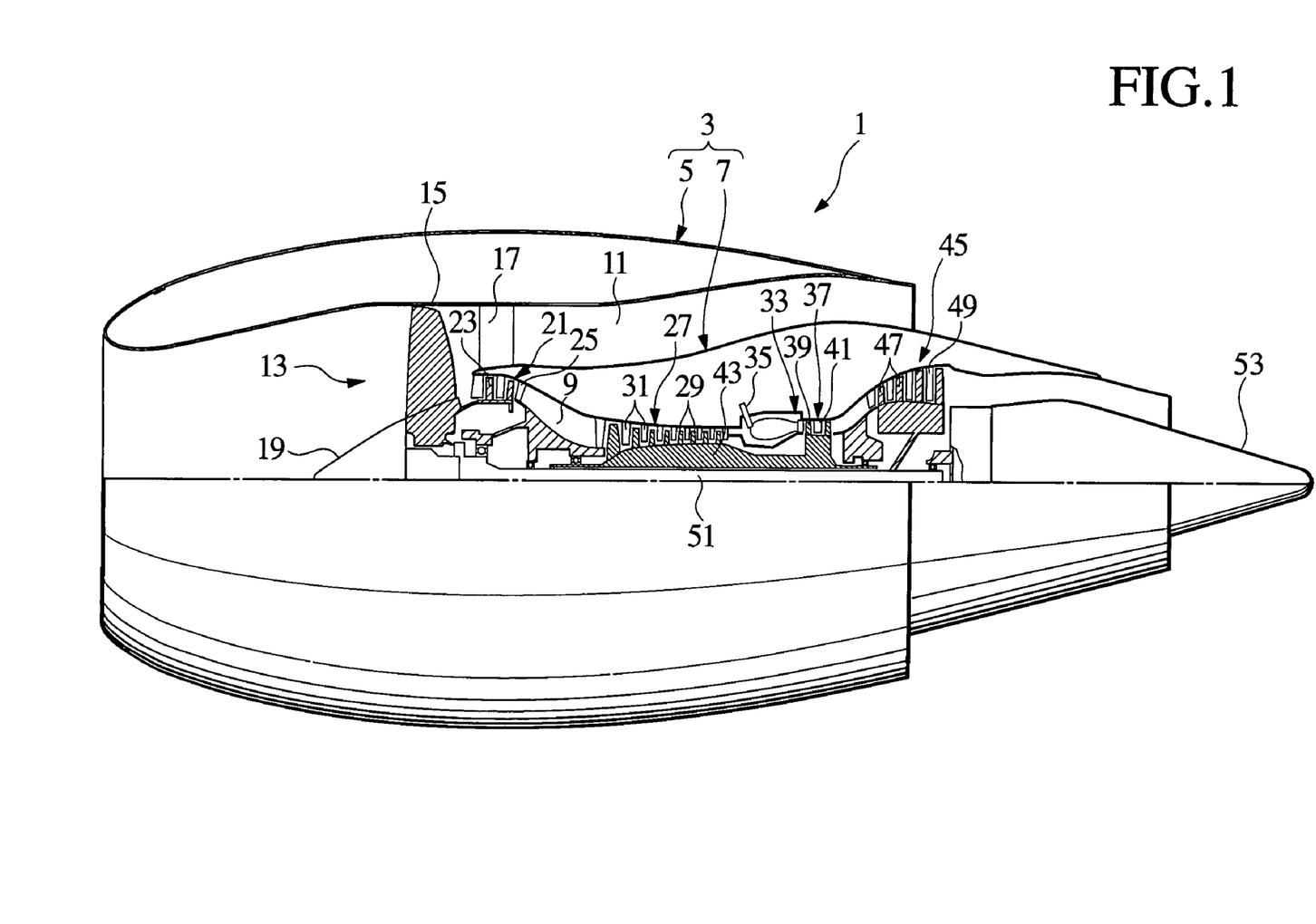
FIG. 1 is a side view of an aircraft engine according to the embodiment, an upper half of which shows a sectional view thereof.

An aircraft engine 1 according to the embodiment of the present invention shown in FIG. 1 is an engine installed in an aircraft. The aircraft engine 1 is provided with a main body 3. The main body 3 is provided with an outer tubular structure 5 and an inner tubular structure 7 integrally formed inside of the outer tubular structure 5. A circular space formed between the inner tubular structure 7 and axial structures housed therein such as a compressor defines a main flow path 9. A circular space formed between the outer tubular structure 5 and the inner tubular structure 7 defines a bypass flow path 11.

The main body 3 is further provided with an inlet cone 19 at an axial thereof and a fan 13 disposed around the inlet cone 19 for feeding air to the main and bypass flow paths 9 and 11. The fan 13 is provided with a fan rotor 15 rotatably disposed in the main body 3 and a fan stator 17 disposed adjacent to and aft of the fan rotor 15 in the bypass flow path 11. The fan stator 17 rectifies a spiral flow of the air fed into the bypass flow path 11 to be an axial flow.

A low pressure compressor 21 is provided aft of the fan rotor 15, for low pressure compressing the air fed into the main flow path 9. The low pressure compressor 21 is provided with plural stages of rotating low pressure compressor rotors 23 and non-rotating low pressure compressor stators 25 reciprocally arranged with each other. The rotors 23 are integrally connected with the fan rotor 15 and radially outwardly extended. The stators 25 are fixed to the inner tubular structure 7 and radially inwardly extended therefrom.

A high pressure compressor 27 is provided aft of the low pressure compressor 21, for further compressing the air compressed by the low pressure compressor 21. The high-pressure compressor 27 is provided with plural stages of rotating high pressure compressor rotors 29 and non-rotating high pressure compressor stators 31 reciprocally arranged with each other.

A combustor 33 is disposed further aft of the high pressure compressor 27, for combustion of fuel in the compressed air. The combustor 33 is provided with plural injection nozzles 35 for injection of the fuel into the compressed air.

A high pressure turbine 37 is disposed still further aft of the combustor 33. The high pressure turbine 37 is provided with a rotating high pressure turbine rotor 39 and a non-rotating high pressure turbine stator 41. The high pressure turbine rotor 39 is connected with the high pressure compressor rotors 29 via a high pressure turbine axis 43 so as to integrally rotate. The high pressure turbine rotor 39 is driven by the combustion gas and hence extracts energy therefrom so as to drive the high pressure compressor 27.

A low pressure turbine 45 is disposed aft of the high pressure turbine 37 and provided with plural stages of rotating low pressure turbine rotors 47 and non-rotating low pressure turbine stators 49 reciprocally arranged with each other. The low pressure turbine rotors 47 are connected with the low pressure compressor rotors 23 via a low pressure turbine axis 51 so as to integrally rotate. The low pressure turbine rotors 47 are driven by the exhaust gas from the high pressure turbine 37 and hence extract energy therefrom so as to drive the low pressure compressor 21. A tail cone 53 is provided further aft of the low pressure turbine 45, for guiding the hot gas injected from the main flow path 9.

Operation of the aircraft engine 1 will be described hereinafter.

The high pressure compressor 27 is started by any conventional starter device (not shown) so that the plural stages of the high pressure compressor rotors 29 rotate and then the aircraft engine 1 is started. The starter device should be switched off when rotation frequency of the high pressure turbine rotor 39 reaches a predetermined value.

Subsequently the fuel is combusted in the compressed air by means of the combustor 33 so that the high and low pressure turbines 37 and 45 are driven. The energy extracted by the turbines 37 and 45 drives the high and low pressure compressors 27 and 21 and the fan 13. Thereby the air fed by the fan 13 into the main flow path 9 is compressed in the low pressure compressor 21 and further compressed in the high pressure compressor 27.

The aforementioned series of operations are continuously done so that the aircraft engine 1 is properly operated and gives propulsion to the aircraft by means of the exhaust gas injected rearward.

Figure 2A:
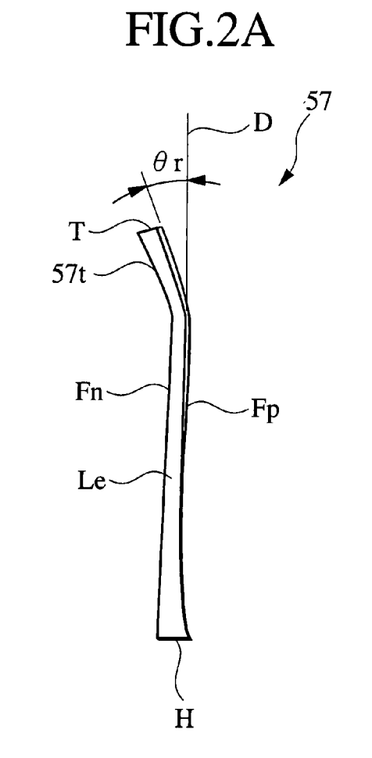
FIG. 2A is a front view of a fan stator vane according to an embodiment of the present invention.
Figure 2B:
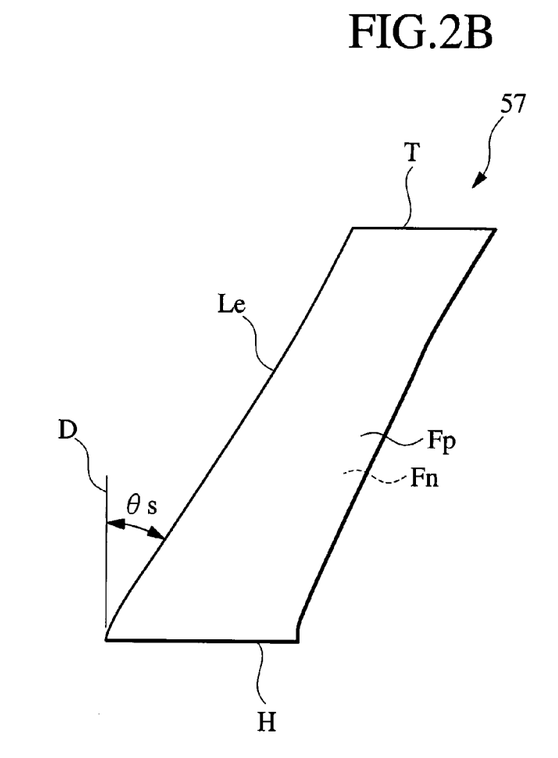
FIG. 2B is a side view of the fan stator vane according to the embodiment.

A constitution of the fan 13 will be described hereinafter with reference to FIGS. 2A and 2B as well as FIG. 1.

The fan 13 is provided with a rotating fan rotor 15 and a non-rotating fan stator 17 disposed adjacent to and aft of the fan rotor 15. The fan rotor 15 is provided with plural fan rotor blades (one of them is shown in FIG. 1) circumferentially arrayed at even intervals. The fan stator 17 is provided with plural stator vanes 57 (one of them is shown in FIG. 1) circumferentially arrayed.

Each of the stator vanes 57 includes a hub end portion 57$h$ and a tip end portion 57$t$. The hub end portion 57$h$ is extended radially from the inner tubular structure 7 and the tip end portion 57$t$ leans toward a suction side Fn thereof and directed to the outer tubular structure 5. A leading edge Le of the stator vane 57 is sweptback. The sweepback angle $\theta_s$ relative to a radial direction D of the fan rotor 15 is in a range from 27 degrees to 33 degrees. A lean angle $\theta_r$ of the tip end portion 57$t$ toward the suction side Fn relative to the radial direction D is in a range from 27 degrees to 33 degrees.

Next, examples will be described hereinafter to demonstrate operation and advantages of the present embodiment of the invention compared with certain comparative examples with reference to FIGS. 3A through 8. Distributions of sound source strengths in the drawings are calculated on the basis of a conventional three-dimension transient computational fluid dynamics analysis and the calculated results are normalized to be dimensionless values. Total pressure losses on vane surfaces are calculated on the basis of a conventional three-dimension steady-state computational viscous fluid dynamics and the results are expressed as regions G where the total pressure losses are relatively high.

Figure 3A:
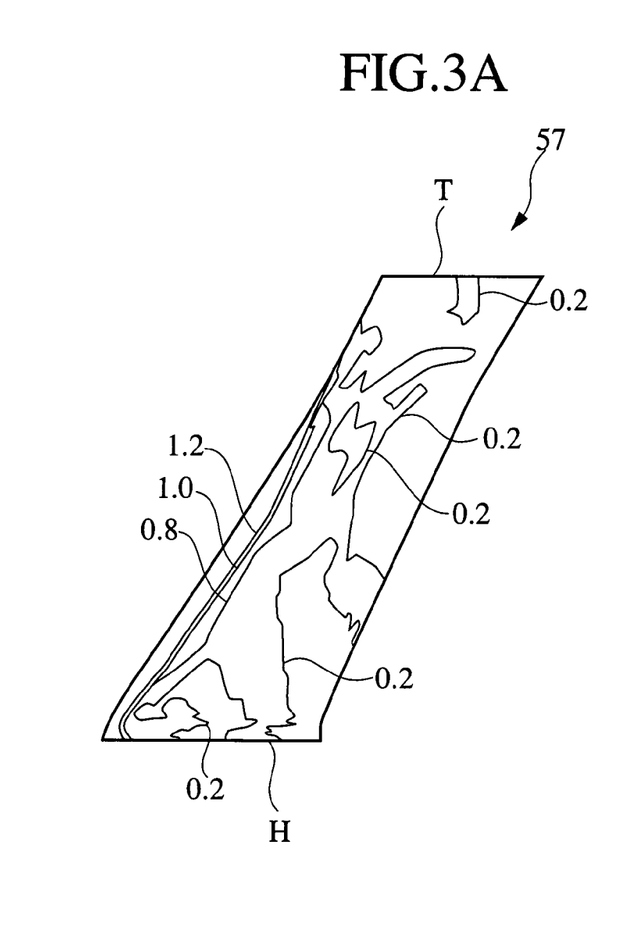
FIG. 3A is distribution of sound source strength drawn on a side view of the fan stator vane.
Figure 3B:
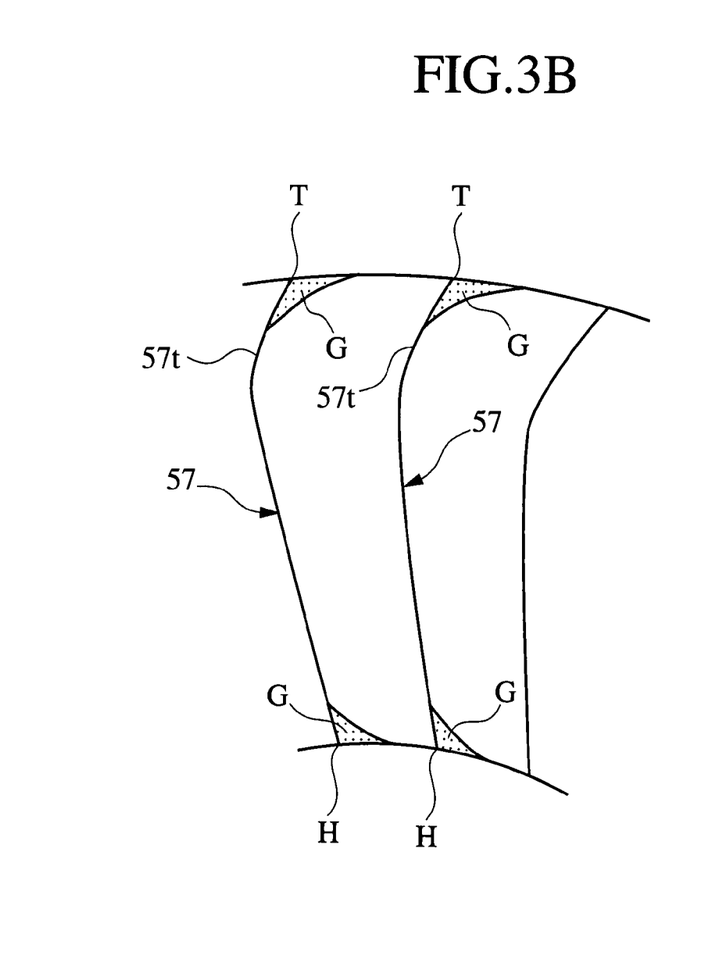
FIG. 3B is a rear view of the fan stator vanes and regions having relatively large pressure loss drawn thereon.
Figure 4A:
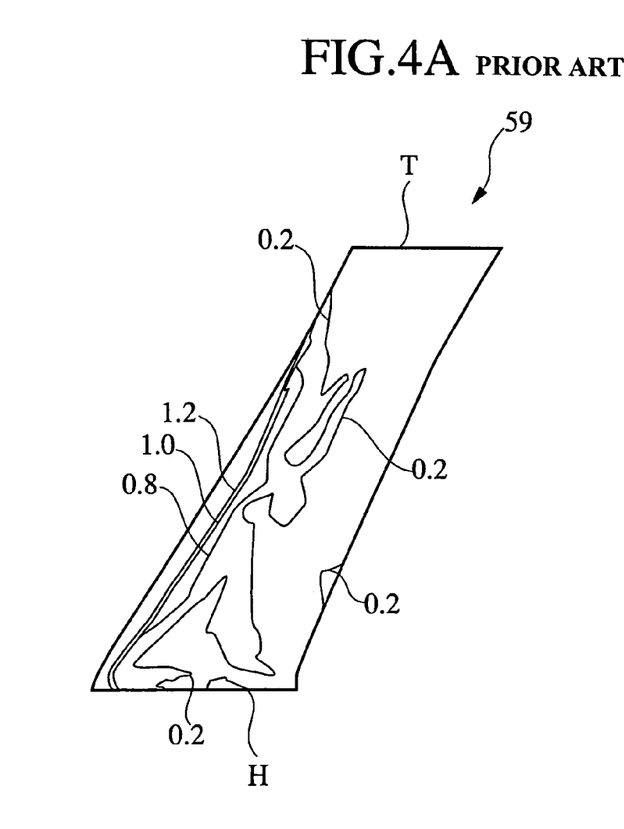
FIG. 4A is distribution of sound source strength drawn on a side view of a fan stator vane of a first comparative example.
Figure 4B:
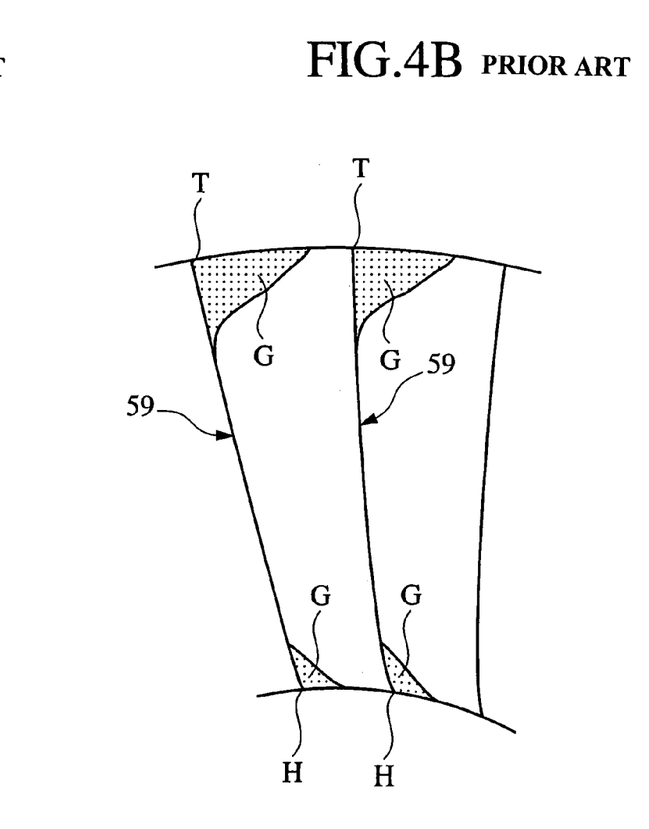
FIG. 4B is a rear view of the fan stator vanes of the first comparative example and regions having relatively large pressure loss drawn thereon.
Figure 5A:
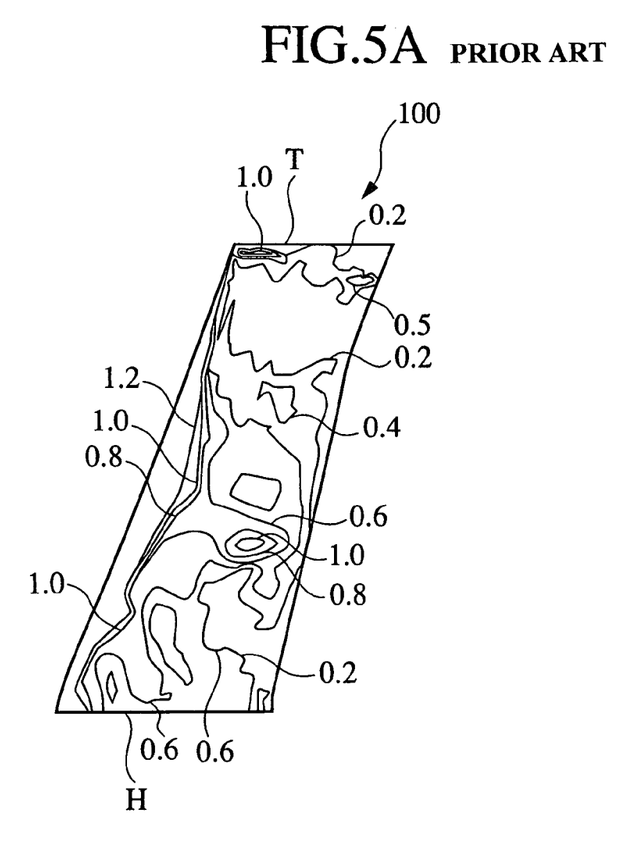
FIG. 5A is distribution of sound source strength drawn on a side view of a fan stator vane of a second comparative example.
Figure 5B:
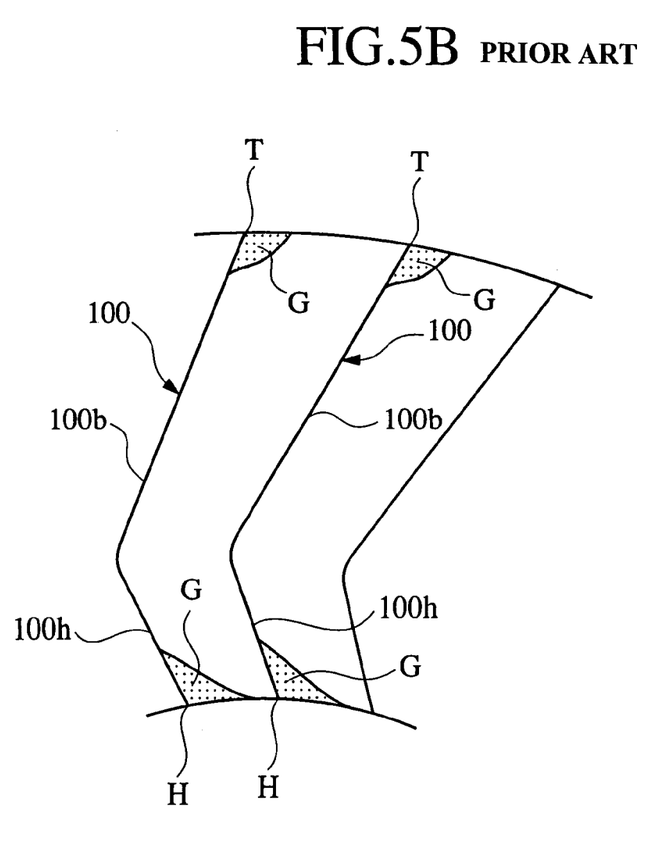
FIG. 5B is a rear view of the fan stator vanes of the second comparative example and regions having relatively large pressure loss drawn thereon.
Figure 6A:
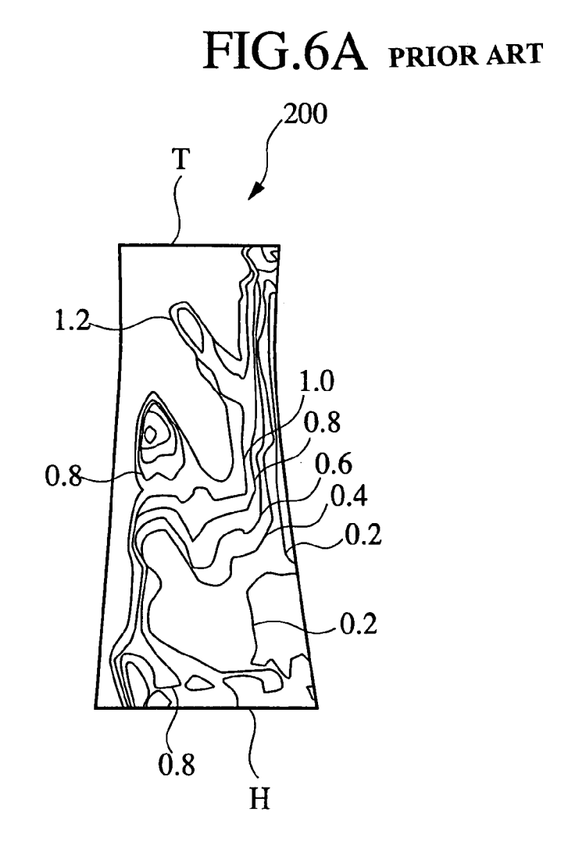
FIG. 6A is distribution of sound source strength drawn on a side view of a fan stator vane of a third comparative example.
Figure 6B:
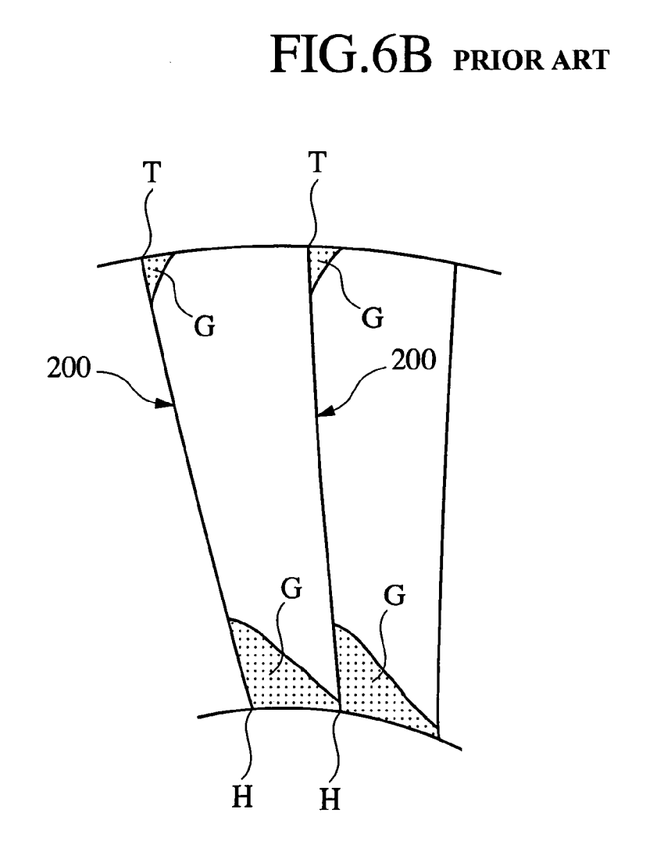
FIG. 6B is a rear view of the fan stator vanes of the third comparative example and regions having relatively large pressure loss drawn thereon.
Figure 7:
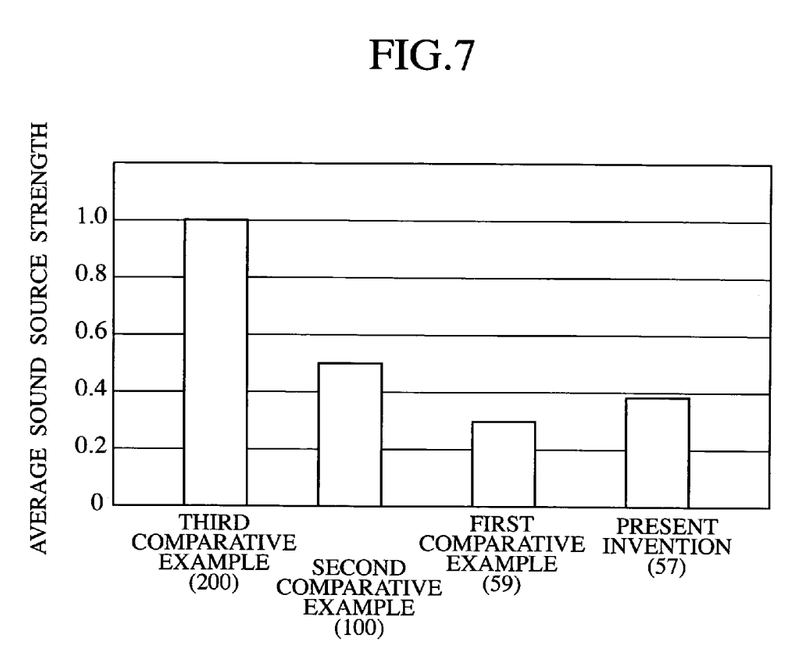
FIG. 7 is a graph showing average sound source strengths of fan stator vanes.
Figure 8:
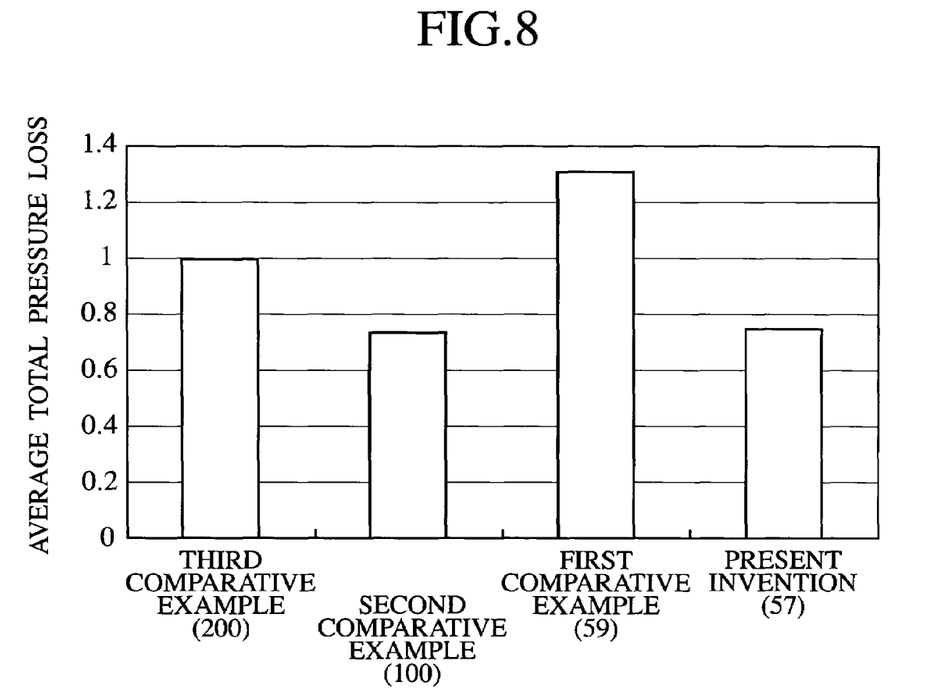
FIG. 8 is a graph showing total pressure losses of fan stator vanes.

FIGS. 3A and 3B are calculated results of an example of the present invention where both the sweepback angle and the lean angle are 30 degrees. FIGS. 4A and 4B are calculated results of a first comparative example where the sweepback angle is 30 degrees though the lean angle is 0 degrees. FIGS. 5A and 5B are calculated results of a second comparative example where the vane is constituted according to the related art described above and the sweepback angle is 20 degrees. FIGS. 6A and 6B are calculated results of a third comparative example where the vane is constituted according to a conventional art, not sweptback and does not include leaning tip end portion. In FIGS. 7 and 8, averaged values are compared with each other.

When starting operation of the fan 13 so as to rotate the fan rotor 15 with the plural fan rotor blades, external air is fed into the main and bypass flow paths 9 and 11. The air fed into the main flow path 9 goes through the compression process, the combustion process and such described above and is emitted from the main flow path 9 as exhaust gas. The air fed into the bypass flow path 11 is rectified by means of the fan stator 17 to be non-spiral flow and emitted from the bypass flow path 11 so as to surround the exhaust gas.

The sweepback angle $\theta_s$ is configured to be in a range from 27 degrees to 33 degrees so that frequency of interference between the stator vanes 57 and trailing flows generated by the rotor blades is increased compared with comparative examples in which the sweepback angle is smaller than the present embodiment or none. Thereby pressure fluctuation on the stator vane surfaces is more effectively suppressed. Further, air flow separation from the hub end portion 57*h* is suppressed and air flow separation from the tip end portion 57*t* is promoted. Such tendencies may be understood on the basis of comparing FIGS. 3A and 3B with FIGS. 4A and 4B.

The lean angle $\theta_r$ is configured to be in a range from 27 degrees to 33 degrees so that frequency of interference between the tip end portion 57*t* and the trailing flows generated by the rotor blades is further increased compared with comparative examples which do not include leaning tip end portion. Thereby phases of pressure fluctuation on the pressure and suction sides Fp and Fn are increased and therefore the pressure fluctuation is effectively balanced out. Furthermore, the promoted air flow separation from the tip end portion 57*t* described above is suppressed as well as suppressing elongation of the whole length of the stator vane 57.

In a case where the stator vanes 57 are applied to an aircraft engine, regions G where total pressure loss is relatively large are prevented from being increased and sound source strength thereof is effectively suppressed as shown in FIGS. 3A and 3B as compared with the comparative examples. Furthermore, average total pressure loss is suppressed in the same level as one of the comparative examples and average sound source strength is effectively suppressed as shown in FIGS. 7 and 8.

As will be understood from the above description, the fan 13 for an aircraft engine 1 to which the stator vanes 57 have many advantages, including that the sound source strength is effectively suppressed though the regions G where the total pressure loss is relatively large are prevented from being increased and therefore the fan noise is effectively suppressed though aerodynamic performance thereof is prevented from being damaged.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A fan stator vane for a fan of an aircraft engine, the fan having an axis and the fan stator vane having a suction side and a pressure side, the fan stator vane comprising:
   a hub end portion extending radially relative to the axis; and
   a tip end portion leaning toward the suction side,
   wherein leading edges of the hub end portion and the tip end portion have sweepback angles of from 27 degrees to 33 degrees relative to a radial direction defined by the axis.

2. The fan stator vane of claim 1, wherein the tip end portion has a lean angle of from 27 degrees to 33 degrees relative to the radial direction toward the suction side.

3. A fan of an aircraft engine, the fan feeding air to circular main and bypass flow paths formed coaxially in the aircraft engine, the fan having an axis and the fan stator vane having a suction side and a pressure side, the fan comprising:
   a fan rotor rotating around the axis and comprising plural rotor blades circumferentially arrayed and configured so as to feed air; and
   a fan stator disposed adjacent to and aft of the fan rotor, the fan stator comprising plural stator vanes circumferentially arrayed and configured so as to rectify the air fed from the fan rotor to be an axial flow, each of the stator vanes comprising;
   a hub end portion extending radially relative to the axis; and
   a tip end portion leaning toward the suction side,
   wherein leading edges of the hub end portion and the tip end portion have sweepback angles of from 27 degrees to 33 degrees relative to a radial direction defined by the axis.

4. The fan of claim 3, wherein the tip end portion has a lean angle of from 27 degrees to 33 degrees relative to the radial direction toward the suction side.

5. An aircraft engine including the fan of claim 3.

* * * * *